Dec. 20, 1955    A. W. RICHARDS ET AL    2,727,407
FLEXIBLE ELASTOMER
Filed Oct. 1, 1952
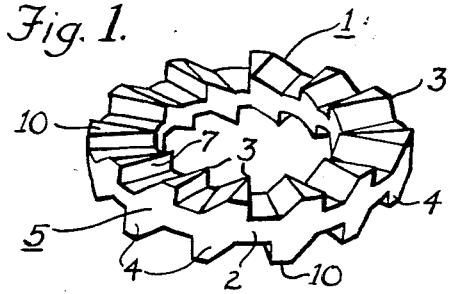
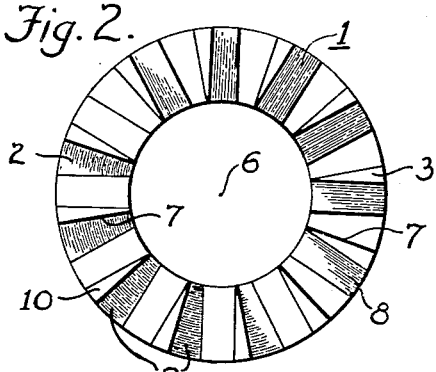
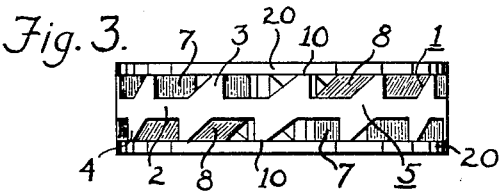
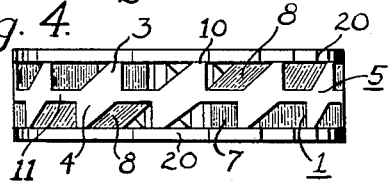
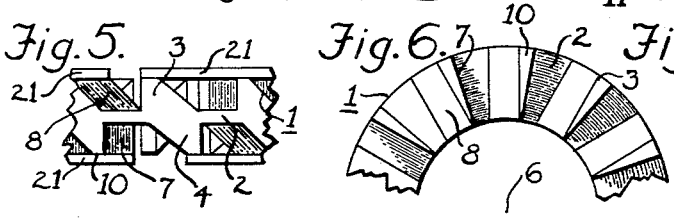
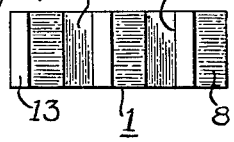
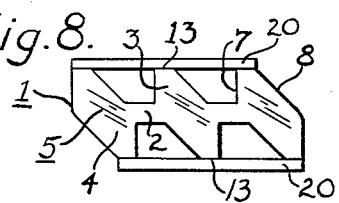
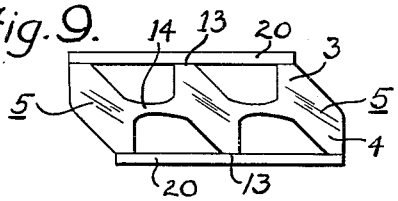
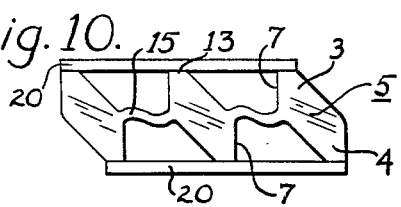
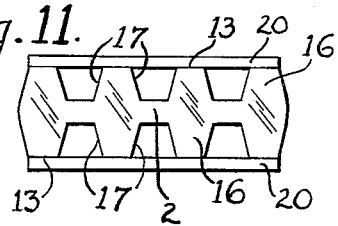
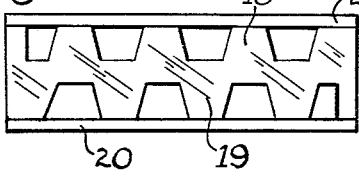
ARCHER W. RICHARDS and ERVIN J. OSTERHUS   INVENTORS
BY William D. Carothers
their Attorney

United States Patent Office 2,727,407
Patented Dec. 20, 1955

2,727,407

FLEXIBLE ELASTOMER

Archer W. Richards, Chagrin Falls, and Ervin J. Osterhus, Cleveland, Ohio, assignors to Syntron Company, Homer City, Pa., a corporation of Delaware Original application September 12, 1950, Serial No. 184,357. Divided and this application October 1, 1952, Serial No. 312,484

8 Claims. (Cl. 74—575)

This invention is a division of application Serial No. 184,357, filed September 12, 1950, now Patent No. 2,635,854 for Tool Rotator for Reciprocating Hammer.

This invention relates generally to flexible elastomer members and more particularly to elastomer members for guiding, transmitting, and otherwise controlling vibratory or reciprocatory motion.

The flexible elastomer members comprising this invention are made from a suitable flexible material such as rubber, natural or synthetic, or other material having similar characteristics. These elastomer members are preferably constructed to provide a series of levers. The disposition or orientation of these levers depends upon the use that is to be made of the elastomer. The levers may extend as a single or multiple vertical series horizontally or in steps; or they may be disposed at an angle to the horizontal. The series of levers are joined together by a flange or web to form an integral or unitary member. The flange or web is preferably of the same material as the levers and may join them all intermediate the ends of the levers. Thus, the flange or web may be flat and lie in a common plane or they may extend in waves or undulations connecting different portions of adjacent levers but permitting them to function or to flex with them. The connecting flanges or webs form an important part of the physical flexing characteristics of the elastomer members and it may be varied in thickness or density to provide the desired flexing characteristics.

When used as a force transmitter, in the manner of a cam, these elastomer members are usually freely mounted between opposed smooth surfaces. They may be in lineal or in ring form with their levers all sloping in the same effective direction. Compressive forces then flex the member as a unit, and the action or reaction against their engaging surfaces may be used to produce relative step by step motion or relative vibration between these surfaces depending upon the disposition of the levers. In such an application, they produce a pawl action providing intermittent motion that may be lineal or annular depending on the form of the pawl.

If the ends of the levers are vulcanized or otherwise secured to opposed surfaces, to support the same for reciprocation or vibration, the flexing characteristics of the levers and the connecting web will determine the natural frequency of reciprocatory vibration of the system. This vibration would be vertical if the levers stand erect and if they all slope in one direction at the same angle, the direction of vibration will be substantially at right angles to the sloping axis of the levers. This action may be transmitted to a deck that will provide a feeding action for materials or articles. If the elastomer were constructed in the form of a ring which supported a flat deck or a spiral conveying surface, the feeding action would be inclined and circular about the common central axis of the elastomer ring.

The elastomer member made up of an integral series of levers comprising this invention has many applications as a flexible pawl to produce lineal or circular step by step motion or as a guide to control reciprocatory vibration in a lineal or circular path depending upon whether the elastomer was straight or ring-form. There are many such applications for each type of these elastomer members such as pawls to rotate vibratory tools; intermittent timing of rotary motion; circular, helical, or spiral vibratory feeding; straight, horizontal or inclined feeding.

Other objects and advantages occur in the following specification and claims.

The accompanying drawings show for the purpose of exemplification without limiting the invention or claims thereto certain practical embodiments of the invention wherein:

Fig. 1 is a perspective view of an elastomer member having a circular web.

Fig. 2 is a plan view of the structure shown in Fig. 1.

Fig. 3 is a view in side elevation of the structure shown in Figs. 1 and 2.

Fig. 4 is a view in side elevation of an elastomer member having a thinner web.

Fig. 5 is a view in side elevation of an elastomer member with its projections sloping in the opposite direction than that of the previous views.

Fig. 6 is a plan view of the structure shown in Fig. 5.

Fig. 7 is a plan view of a straight elastomer member.

Fig. 8 is a view in side elevation of the structure shown in Fig. 7.

Fig. 9 is a view in side elevation of a straight elastomer member having a web of variable thicknesses.

Fig. 10 is a view in side elevation of an elastomer member that is flexed due to compressive forces applied thereto.

Fig. 11 is a view in side elevation of an elastomer, the cooperating projections on opposite sides of the web are congruent to each other.

Fig. 12 is a view in side elevation wherein the cooperating projections on opposite sides of the web are offset from each other.

Referring to Figs. 1, 2, and 3 in the application, the elastomer member 1 is made up of the web member 2 with a series of projections 3 on the upper side and a series of projections 4 on the lower side of the web. However, if the web were not considered, the projections 3 and 4, as shown in Figs. 1, 2, and 3 represent a single lever member that could be generally indicated at 5.

Since the web 2, in the structure as shown in Figs. 1 to 3 is annular, the upper and lower projections 3 and 4 that form the lever members 5, are disposed uniformly about a central vertical axis, such as illustrated at 6 in Fig. 2. The upper and lower projections 3 and 4 have a vertical face 7 which lies in radial planes relative to the axis 6. The other face of each projection slopes as indicated at 8. All of the faces of each of the upper and lower projections have the same slope. Since the elastomer member in Figs. 1 to 3 has an annular web, these faces are disposed at substantially the same angle relative to the horizontal when considered as free bodies.

The upper and lower ends of the lever members 5 are flat as indicated at 10, and when the web members are annular or ring-form, these flat sections 10 become wedges or pie-shaped as indicated in Fig. 2. If, however, the webs are straight, these sections would take a rectangular form in cross-section, as illustrated hereinafter.

When the annular elastometer members, as illustrated in Figs. 1 to 3, are compressed between parallel surfaces, the lever members 5 are caused to flex in the direction of their slope, and their flexing also flexes the web member 2. It will be noted that the web member 2 is uniform in thickness and width throughout the elastomer member.

However, in Fig. 4, the web member 11 is thinner than that illustrated in Fig. 3. Thus, the flexing characteristics of these elastomer members may be varied by producing a structure that has a thinner or heavier web section.

Again, it will be noted that in the structure, as shown in Figs. 1 to 4 inclusive, the lever members 5 are sloped in the same direction, whereas, in the structure shown in Figs. 5 and 6, the lever members 5 are sloped in the opposite direction, and the vertical faces 7 are on the opposite sides of the lever members than that illustrated in Figs. 3 and 4. The direction of slope of the levers in a circular elastomer, such as shown in Figs. 1 to 6 determines the direction of the vibratory action. An application for oppositely sloping or opposed levers may be found in applicant's application Serial No. 184,357, now Patent No. 2,635,854, of which the present application is a division.

In the structure shown in Figs. 7 and 8, the elastomer member is made in a straight section and the web member 2 is substantially rectangular, connecting a series of lever members which are somewhat the same as that illustrated in Figs. 3, 4 and 5. Here, the top and bottom surfaces 13 are rectangular in shape, owing to the fact that the web follows a straight path rather than a circular path.

In the structure of Fig. 9, the lever members 5, with their opposite portions 3 and 4, are connected by the web 14 that varies in thickness. These particular web members are thinner intermediate of their ends, and thus, the greatest flexing occurs at this point, and the thinness together with the taper to this section of the web, determines the flexing characteristics of the elastomer.

The web 15 of the elastomer shown in Fig. 10 is thin, and is shown in a flexed position. The lever members 5 becomes slightly deformed when they are flexed as the surfaces in back of the levers must be stretched and the surfaces on their forward faces in the direction of the movement of the lever are subject to compression which bulges them slightly. The flat faces 10 or 13 remain substantially parallel to each other.

In the structure illustrated in Fig. 11, the upper and lower projections 16 are truncated and are disposed on top of each other, and do not slope relative to the web or to the horizontal. The side surfaces 17 thus slope toward each other at the end of the projection. In this structure, the levers themselves become deformed when subject to compressive forces, and provide a structure for a vertical oscillating member. The web members 2 do not flex noticeably.

In the structure shown in Fig. 12, the upper projections 18 are equally offset from the lower projections 19 which obliterates the web member 2. In this structure, the bottom of the truncated projections include the web member and takes the greater part in the flexing characteristics of the structure than the structure of Fig. 11.

When these elastomer members are to be employed as cams, they are used without any base or other attachment as the upper and lower surfaces 10 and 13 must engage and create friction against the surfaces that they are to move intermittently. If, on the other hand, these elastomers are to be used as guides in supporting a vibratory member, the ends 10 or 13 are preferably made fast to a metal ring or plate as indicated at 20. These rings or plates may have threaded holes therein for receiving mounting screws for clamping them on the base and the frame to be vibrated. If the sections are long, they may be made shorter and if they are large rings, as indicated in Fig. 5, the annular plates are formed into the arcuate section 21 as shown.

We claim:

1. A flexible member to control motion comprising an elastomer having a flexible web, a series of uniformly spaced projections integral with and extending from the opposite sides of said web, the projections on opposite sides of said web cooperating with each other, the projections on the same side of said web lying in the same direction, and a plate means secured to a plurality of the ends of said projections on the same side of said web.

2. The structure of claim 1 characterized in that the web of said elastomer and the plate means attached to the ends of the projections are annular.

3. The structure of claim 1 characterized in that the projections and the plate means connecting the plurality of projections of said elastomer are sectioned.

4. The structure of claim 1 characterized in that the web of said elastomer and the plate attached to the ends of the projections are straight sections.

5. The structure of claim 1 characterized in that said flexible web is continuous and said plate means is sectioned.

6. The structure of claim 1 characterized in that a separate plate means is secured to a plurality of the ends of said projections on both sides of said web.

7. The structure of claim 1 characterized in that the longitudinal axis of said projections is substantially normal to said plate means.

8. The structure of claim 1 characterized in that the longitudinal axis of the projections on one side of the web is offset from the longitudinal axis of the projections on the opposite side of the web.

References Cited in the file of this patent

UNITED STATES PATENTS 2,635,854     Richards et al.  ----------  Apr. 21, 1953